United States Patent
Cho et al.

(10) Patent No.: US 7,329,365 B2
(45) Date of Patent: Feb. 12, 2008

(54) ETCHANT COMPOSITION FOR INDIUM OXIDE LAYER AND ETCHING METHOD USING THE SAME

(75) Inventors: Hong-Je Cho, Cheonan-si (KR);
Seung-Yong Lee, Daejeon-si (KR);
Joon-Woo Lee, Iksan-si (KR);
Jae-Yeon Lee, Iksan-si (KR);
Seung-Hwan Chon, Jeonju-si (KR);
Yong-Suk Choi, Seoul (KR);
Young-Chul Park, Iksan-si (KR);
Jin-Su Kim, Daejeon-si (KR);
Kyu-Sang Kim, Yongin-si (KR);
Dong-Uk Choi, Suwon-si (KR);
Kwan-Tack Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 4 days.

(21) Appl. No.: 11/208,545

(22) Filed: Aug. 23, 2005

(65) Prior Publication Data

US 2006/0043332 A1    Mar. 2, 2006

(30) Foreign Application Priority Data

Aug. 25, 2004 (KR) ................. 10-2004-0067013

(51) Int. Cl.
*B44C 1/22* (2006.01)
(52) U.S. Cl. .................. 216/83; 216/96; 216/100; 216/105; 252/79.1; 438/688; 438/689; 438/706; 438/729; 438/733; 438/745
(58) Field of Classification Search .............. 216/83; 252/79.1; 438/688
See application file for complete search history.

(56) References Cited

U.S. PATENT DOCUMENTS

| 4,171,242 A | | 10/1979 | Liu | |
| 5,366,588 A | * | 11/1994 | Scholten et al. | 216/101 |
| 6,818,142 B2 | * | 11/2004 | Tufano et al. | 216/83 |

FOREIGN PATENT DOCUMENTS

| JP | 60-186019 | 9/1985 |
| JP | 60-186020 | 9/1985 |
| JP | 01-191788 | 8/1989 |
| JP | 2000-133635 | 5/2000 |
| JP | 2004-253524 | 9/2004 |
| KR | 1019980070026 | 10/1998 |
| KR | 1020040005457 | 1/2004 |
| KR | 100448868 | 9/2004 |
| KR | 1020040080963 | 9/2004 |
| KR | 100456373 | 11/2004 |
| KR | 1020040097584 | 11/2004 |

OTHER PUBLICATIONS

W. Kern, Handbook of Semiconductor Wafer Cleaning Technology, William Andrew Publishing (1993)., pp. 121, 123, 125-127.*

* cited by examiner

*Primary Examiner*—Duy-Vu N. Deo
*Assistant Examiner*—Maki Angadi
(74) *Attorney, Agent, or Firm*—F. Chau & Associates, LLC.

(57) ABSTRACT

An etchant for removing an indium oxide layer includes sulfuric acid as a main oxidizer, an auxiliary oxidizer such as $H_3PO_4$, $HNO_3$, $CH_3COOH$, $HClO_4$, $H_2O_2$, and a Compound A that is obtained by mixing potassium peroxymonosulfate ($2KHSO_5$), potassium bisulfate ($KHSO_4$), and potassium sulfate ($K_2SO_4$) together in the ratio of 5:3:2, an etching inhibitor comprising an ammonium-based material, and water. The etchant may remove desired portions of the indium oxide layer without damage to a photoresist pattern or layers underlying the indium oxide layer.

7 Claims, No Drawings

ETCHANT COMPOSITION FOR INDIUM OXIDE LAYER AND ETCHING METHOD USING THE SAME

CROSS REFERENCE TO RELATED APPLICATION

This application claims priority to and the benefit of Korean Patent Application No. 10-2004-0067013, filed on Aug. 25, 2004, which is hereby incorporated by reference for all purposes as if fully set forth herein.

BACKGROUND OF THE INVENTION

1. Field of the Invention

The present invention relates to an etchant composition used to etch an indium oxide layer including indium zinc oxide (IZO) or indium tin oxide (ITO) that is formed on a substrate of an electronic device.

2. Description of the Background

IZO may be prepared by mixing indium oxide ($In_2O_3$) and zinc oxide (ZnO) in a suitable ratio. ITO may be prepared by mixing indium oxide ($In_2O_3$) and tin oxide ($SnO_3$) in a suitable ratio.

A layer of ITO or IZO may serve as a transparent electrode and may be formed by several process steps. In particular, ITO or IZO is first deposited on a glass substrate by a known method such as sputtering to form an indium oxide layer, and a photoresist is then coated on the indium oxide layer. Next, the photoresist is exposed and developed to form a desired pattern. The indium oxide layer is then selectively etched through the photoresist pattern, resulting in the formation of a transparent electrode.

The indium oxide layer typically exhibits prominent chemical resistance and serves as an obstacle during an etching process which makes the process quite difficult.

Conventional etchants for etching an indium oxide layer include an aqua regia-based etchant ($HCl+HNO_3$) disclosed in Korean Patent Publication No. 96-2903, an etchant containing one of hydrochloric acid, weak acid, and alcohol-based compound disclosed in Korean Patent Publication No. 97-65685, a ferric chloride-based etchant ($FeCl_3+HCl$) disclosed in U.S. Pat. No. 5,456,795, an etchant containing oxalic acid, oxalate, and aluminum chloride as main components disclosed in Korean Patent Publication No. 2000-0017470, and an etchant containing hydrogen iodides (HI) and ferric chloride ($FeCl_3$) disclosed in U.S. Pat. No. 5,340,491.

The aqua regia-based etchant has a low price but it damages the profile of an etching pattern and its compositions vary easily due to volatility of hydrochloric acid and nitric acid.

The ferric chloride-based etchant has the same problems as the aqua regia-based etchant since its main component is hydrochloric acid.

The etchant that includes oxalic acid shows good etching efficiency but it is apt to be crystallized since it shows poor solubility at a low temperature.

The etchant that includes HI is advantageous because it exhibits a higher etch rate and causes very little damage to the pattern profile. Nevertheless, this etchant is difficult to use in process lines because it is too expensive, has strong toxic properties, and is corrosive.

In addition, since most known etchants in the art have higher chemical activity, they may erode adjacent layers made of metals that have lower chemical resistance, such as Mo, Al, and Cr, for example. Accordingly, electronic devices such as thin-film transistor liquid crystal displays (TFT-LCD) that have multi-layered structures have limitations on the compositions of the multi-layered structures.

Furthermore, the etchants that contain hydrochloric acid generate fumes that may cause air pollution. For this reason, proper exhaust facilities are required and much caution is required when operating the production lines.

SUMMARY OF THE INVENTION

The present invention provides an etchant composition that improves the etching selection ratio, which is the etching ratio between the indium oxide layer and other layers, and the reproducibility of etching process. In addition, it has higher stability at the operating temperatures, while not generating fumes during the etching process.

The present invention also provides a method for etching a layer of ITO or IZO.

Additional features of the invention will be set forth in the description which follows, and in part will be apparent from the description, or may be learned by practice of the invention.

The present invention discloses an etchant that removes an indium oxide layer comprising about 1 wt % to about 15 wt % of sulfuric acid ranging from based on the total weight of the etchant, about 0.02 wt % to about 5 wt % of an auxiliary oxidizer, about 0.01 wt % to about 5 wt % of an etching inhibitor, and balance water.

The invention also discloses a method for etching an indium oxide layer comprising forming an indium oxide layer on a substrate, forming a photoresist pattern on the indium oxide layer, and selectively etching the indium oxide layer through the photoresist pattern using an etchant. The etchant comprises about 1 wt % to about 15 wt % of sulfuric acid ranging from based on the total weight of the etchant about 0.02 wt % to about 5 wt % of an auxiliary oxidizer, about 0.01 wt % to about 5 wt % of an etching inhibitor, and balance water.

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

The etchant of the present invention can completely remove desired portions of an indium oxide layer without causing damage to a photoresist pattern. Furthermore, this etchant does not affect the layers underlying the indium oxide layer. Accordingly, this etchant can improve the production efficiency of electronic devices such as display devices.

The etchant for indium tin oxide (ITO) layers of the present invention comprises about 2 wt % to about 7 wt % of sulfuric acid, about 0.05 wt % to about 3.0 wt % of an auxiliary oxidizer, about 0.05 wt % to about 4.0 wt % of an etching inhibitor, and balance water.

Sulfuric acid, which functions as a main oxidizer in the etchant of this invention, may be produced by any known method in the art. The purity of the sulfuric acid may be that which is suitable for use in semiconductor processes.

The auxiliary oxidizer may include, but is not limited to $H_3PO_4$, $HNO_3$, $CH_3COOH$, $HClO_4$, $H_2O_2$, and Compound A which is obtained by mixing potassium peroxymonosulfate ($2KHSO_5$), potassium bisulfate ($KHSO_4$), and potassium sulfate ($K_2SO_4$) together in the ratio of 5:3:2. For example, Compound A may include Oxone® (Dupont).

The etching inhibitor comprises ammonium ion ($NH_4^+$) containing compounds. For example, the etching inhibitor may include, but is not limited to $CH_3COONH_4$, $NH_4SO_3NH_2$, $NH_4C_6H_5O_2$, $NH_4COONH_4$, $NH_4Cl$, $NH_4H_2PO_4$, $NH_4OOCH$, $NH_4HCO_3$, $H_4NO_2CCH_2C(OH)(CO_2NH_4)CH_2CO_2NH_4$, $NH_4PF_6$, $HOC(CO_2H)(CH_2CO_2NH_4)_2$, $NH_4NO_3$, $(NH_4)_2S_2O_8$, $H_2NSO_3NH_4$, and $(NH_4)_2SO_4$. Preferably, one of $CH_3COONH_4$, $H_4NO_2CCH_2C(OH)(CO_2NH_4)CH_2CO_2NH_4$, $HOC(CO_2H)(CH_2CO_2NH_4)_2$, and $NH_4NO_3,(NH_4)_2SO_4$ may be used.

Sulfuric acid, the auxiliary oxidizer, and the etching inhibitor may be mixed randomly as long as the mixture (i.e., the etchant) improves the etching selection ratio between the indium oxide layer and different layers. In addition, the etchant improves the reproducibility of the etching process without lowering the etching properties and minimizes fumes, while maintaining a high stability at the etching temperature. For example, the etchant of the present invention may comprise about 1 wt % to about 15 wt % of sulfuric acid based on the total weight of the etchant, about 0.02 wt % to about 5 wt % of the auxiliary oxidizer, about 0.01 wt % to about 5 wt % of the etching inhibitor, and balance water. Preferably the etchant may be prepared in a ratio of sulfuric acid:auxiliary oxidizer:etching inhibitor of 5:1:0.5 and balance water.

In the present invention, various types of water may be used to prepare the etchant including, but not limited to deionized water with a resistivity (a degree of removing ion from the water) of more than 18 MΩ/cm.

To improve etching performance, the etchant of the present invention may further comprise known additives. The type of additive may include, but is not limited to a surfactant, a metal-ion sequestering agent, and a corrosion inhibiting agent. A surfactant may be added to the etchant to ensure uniformity of the etching by lowering surface tension. A surfactant that is capable of withstanding the etchant and is compatible with the etchant is preferably used. For example, an anionic surfactant, a cationic surfactant, an amphoteric surfactant, and a nonionic surfactant may be used in this invention. A fluorine-based surfactant may be also added to the etchant. In addition, manifold additives, which are known in the art, may also be added.

The additives may be added in a range of about 0.0001 wt % to about 0.01 wt % based on the total weight of the etchant.

The etchant of this invention may completely remove the desired portions of the indium oxide layers (i.e., ITO or IZO layer) that are formed on the substrates of the electronic devices, while not reacting with a photo-reactive material such as a photoresist. Furthermore, the problem of crystallization of oxalic acid at temperatures below zero degrees, which has been known as a problem of oxalic acid-based etchants, is not present in this etchant. Also, as opposed to known hydrochloric acid-based etchants, this etchant does not impact underlying metal layers. Accordingly, this etchant may improve the production efficiency of electronic devices that include indium oxide layers, such as display devices.

The present invention also provides a method for etching the indium oxide layer. The method comprises first forming an IZO layer or an ITO layer on a substrate of an electronic device, then selectively forming a photoresist pattern on the IZO layer or the ITO layer, and finally etching the IZO layer or the ITO layer using an etchant of the present invention.

The first step may include the substeps of fabricating devices on a substrate for a liquid crystal display and depositing IZO or ITO on the substrate to form an indium oxide layer. The indium oxide layer may be formed after cleaning the substrate. The substrate may comprise glass or quartz. The indium oxide layer is deposited by a known technique in the art such as sputtering, and is about 200 Å to about 600 Å thick.

A fabric may be also provided between the substrate and the indium oxide layer. The term "fabric" used in this description refers to a structure obtained by performing photolithography and etching processes on at least one of an organic layer, a semiconductor layer made of amorphous silicon or polycrystalline silicon that are formed by chemical vapor deposition (CVD), and a conductive layer formed by sputtering.

In the second step, the term "selectively" means that the photoresist that covers the indium oxide layer is partially exposed to light through a photomask and developed, thereby forming an etching pattern that is used to remove desired portions of the indium oxide layer in etching process.

In order for the indium oxide layer to exist only on desired portions of the substrate, a photo-reactive material such as a photoresist is first coated on the substrate and selectively exposed to light through a photomask. Then the exposed portions are removed by a developing solution. In this step, when a photo-reactive material is a photoresist, it is spin-coated on the indium oxide layer to a thickness of about 1 µm. The photo-reactive material may be either a negative type or a positive type material. An ashing process and/or thermal treatment may additionally be performed in this step.

The etching process of the third step may be performed in accordance with a known technique in the art such as immersion etching or spray etching. In this step, an etchant solution with a temperature of about 20° C. to about 50° C. is used. A suitable temperature of the etchant may vary depending on other processes and process parameters.

The present invention will be described further using the following examples.

EXAMPLE 1

Sulfuric acid, an auxiliary oxidizer, and an etching inhibitor listed in Table 1 were first mixed in the weight ratio of 1:1:0.5. Then 25 ppm of a fluorosurfactant (FT-248, Bayer) was added to the mixture. A balance amount of deionized water was then added to the mixture resulting in an etchant.

A 500 Å thick indium oxide layer was deposited on a glass substrate. Then, a 1 µm thick photoresist was coated on the indium oxide layer. The coated substrate was etched by spray etching with the prepared etchant at about 40° C. and an etch rate of about 20 Å/sec.

EXAMPLES 2-28

Etched substrates were prepared according to the weight ratios listed in Table 1 and following the same method as in Example 1. The results of these examples are also shown in Table 1.

As shown in Table 1, the etchants prepared in Examples 1 to Example 28 did not impact the photoresist and did not generate residues. In addition, they did not attack layers underlying the indium oxide layers and showed good etching results.

COMPARATIVE EXAMPLES 1-5

Each etchant was prepared by mixing sulfuric acid, an auxiliary oxidizer, and an etching inhibitor according to the weight ratios listed in Table 2. These Comparative Examples were prepared following the same method as in Example 1. The results of these Comparative Examples are also shown in Table 2.

As shown in Table 2, some problems such as residues of the indium oxide layers, a poor profile, partial etching, undesired etching of underlying layers, and even no etching resulted.

TABLE 1

| Example | Surfuric acid/ Nitric acid/ $NH_4NO_3$ (wt %) | Residues | Attack for Underlying Layer | Attack for Photoresist |
|---|---|---|---|---|
| 1 | 1/1/0.5 | X | X | X |
| 2 | 5/1/0.5 | X | X | X |
| 3 | 10/1/0.5 | X | X | X |
| 4 | 15/1/0.5 | X | X | X |
| 5 | 10/0.1/0.5 | X | X | X |
| 6 | 10/0.5/0.5 | X | X | X |
| 7 | 10/2/0.5 | X | X | X |
| 8 | 10/3/0.5 | X | X | X |
| 9 | 10/5/0.5 | X | X | X |
| 10 | 10/2/0.01 | X | X | X |
| 11 | 10/2/0.1 | X | X | X |
| 12 | 10/2/1 | X | X | X |
| 13 | 10/2/3 | X | X | X |
| 14 | 10/2/5 | X | X | X |
| | Surfuric acid/Perchloric acid/$CH_3COONH_4$ | | | |
| 15 | 1/1/0.5 | X | X | X |
| 16 | 5/1/0.5 | X | X | X |
| 17 | 10/1/0.5 | X | X | X |
| 18 | 15/1/0.5 | X | X | X |
| 19 | 10/0.1/0.5 | X | X | X |
| 20 | 10/0.5/0.5 | X | X | X |
| 21 | 10/2/0.5 | X | X | X |
| 22 | 10/3/0.5 | X | X | X |
| 23 | 10/5/0.5 | X | X | X |
| 24 | 10/2/0.01 | X | X | X |
| 25 | 10/2/0.1 | X | X | X |
| 26 | 10/2/1 | X | X | X |
| 27 | 10/2/3 | X | X | X |
| 28 | 10/2/5 | X | X | X |

TABLE 2

| Comparative Example | Surfuric acid/ Nitric acid/ $NH_4NO_3$ (wt %) | Residues | Attack for Underlying Layer | Attack for Photoresist |
|---|---|---|---|---|
| 1 | 5/0.1/0 | ○ | ○ | X |
| 2 | 5/0.01/0.1 | Poor Profile | X | X |
| 3 | 5/0/0.1 | Partial Etching | X | X |
| 4 | 0.5/0.5/0.1 | Non-etching | X | X |
| 5 | 25/0.5/0.1 | X | X | ○ |

The following Comparative Examples 6-8, where known etchants in the art were used in an etching process for multi-layered structure including layers with poor chemical-resistance properties, are given for comparison with the etchants of Example 7 to Example 9.

COMPARATIVE EXAMPLE 6

18 wt % hydrochloric acid and 5 wt % nitric acid were mixed, and 25 ppm of a fluorosurfactant (FT-248 manufactured by Byer) was added to the mixture. A balance amount of deionized water was then added thereto, resulting in the formation of a typical aqua regia-based etchant.

COMPARATIVE EXAMPLE 7

22 wt % ferric chloride ($FeCl_3$) and 10 wt % hydrochloric acid were mixed, and 25 ppm of a fluorosurfactant (FT-248 by Byer) was added to the mixture. A balance amount of deionized water was then added thereto, resulting in the formation of a typical ferric chloride-based etchant.

COMPARATIVE EXAMPLE 8

25 ppm fluorosurfactant (FT-248 manufactured by Byer) was added to 5 wt % oxalic acid and a balance amount of deionized water, resulting in the formation of a typical oxalic acid-based etchant.

The conventional etchants of Comparative Example 6, Comparative Example 7, and Comparative Example 8 were prepared at 40° C., which is a common temperature in production lines of commercial etchants, since such etchants generate fumes and their composition may be changed.

Sample pieces of various kinds of layers, for example, a 2000 Å thick Al—Nd layer, a 2000 Å thick Mo layer, a 1500 Å thick Cr layer, a 3000 Å thick SiNx layer, a 1500 Å thick a-Si layer were etched by spraying the etchants of Comparative Examples 6-8 and the etchants of Examples 7-9, respectively. In this experiment, the etching was performed for 10 minutes at 40° C. to raise the etching selection ratio between the indium oxide layer and the Al—Nd layer. The degree of etching of the samples was measured by SEM and the results are shown in Table 3.

TABLE 3

| Kind of etchant | | Comparative Example 6 | Comparative Example 7 | Comparative Example 8 | Example 7 | Example 8 | Example 9 |
|---|---|---|---|---|---|---|---|
| Processing temperature (° C.) | | 40 | 40 | 40 | 40 | 40 | 40 |
| Processing time (sec) | | 100 | 100 | 100 | 100 | 100 | 100 |
| Degree of etching (%) | ITO | 100 | 100 | 100 | 100 | 100 | 100 |
| | IZO | 100 | 100 | 100 | 100 | 100 | 100 |
| | Al—Nd | 100 | 100 | 12 | 0 | 0 | 0 |
| | Mo | 100 | 100 | 5 | 0 | 0 | 0 |
| | Cr | 0 | 0 | 0 | 0 | 0 | 0 |
| | SiNx | 0 | 0 | 0 | 0 | 0 | 0 |
| | a-Si | 0 | 0 | 0 | 0 | 0 | 0 |

Table 3 shows that Al—Nd layers were seriously damaged by the aqua regia-based etchant (Comparative Example 6) and the ferric chloride-based etchant (Comparative Example 7). Table 3 also shows that the etchant of the present invention does not attack the Al—Nd layer. As a result, the indium oxide layer was completely etched by the etchant of the present invention and other layers were not affected.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An etchant for removing an indium oxide layer, comprising:
   about 1 wt % to about 15 wt % of sulfuric acid based on the total weight of the etchant;
   about 0.02 wt % to about 5 wt % of an auxiliary oxidizer;
   about 0.01 wt % to about 5 wt % of an etching inhibitor; and
   a balance amount of water of at least about 75 wt %.

2. The etchant of claim 1, wherein the etching inhibitor comprises ammonium ion-containing compounds.

3. The etchant of claim 1, wherein the auxiliary oxidizer is selected from the group consisting of $H_3PO_4$, $HNO_3$, $CH_3COOH$, $HClO_4$, $H_2O_2$, and Compound A, wherein Compound A is obtained by mixing potassium peroxymonosulfate ($2KHSO_5$), potassium bisulfate ($KHSO_4$), and potassium sulfate ($K_2SO_4$) together in the ratio of 5:3:2.

4. The etchant of claim 1, wherein the etching inhibitor is selected from the group consisting of $CH_3COONH_4$, $NH_4SO_3NH_2$, $NH_4C_6H_5O_2$, $NH_4COONH_4$, $NH_4Cl$, $NH_4H_2PO_4$, $NH_4OOCH$, $NH_4HCO_3$, $H_4NO_2CCH_2C(OH)(CO_2NH_4)CH_2CO_2NH_4$, $NH_4PF_6$, $HOC(CO_2H)(CH_2CO_2NH_4)_2$, $NH_4NO_3$, $(NH_4)_2S_2O_8$, $H_2NSO_3NH_4$, and $(NH_4)_2SO_4$.

5. The etchant of claim 1, wherein the water is deionized.

6. The etchant of claim 1, further comprising an additive selected from the group consisting of a surfactant, a metal-ion sequestering agent, and a corrosion inhibiting agent.

7. The etchant of claim 1, wherein the indium oxide layer comprises indium zinc oxide (IZO) or indium tin oxide (ITO).

* * * * *